Jan. 25, 1927.

W. FINNE 1,615,619

TWO-WAY WATER TURBINE

Filed May 8, 1925  2 Sheets-Sheet 2

Inventor
William Finne,

Patented Jan. 25, 1927.

1,615,619

UNITED STATES PATENT OFFICE.

WILLIAM FINNE, OF HIBBING, MINNESOTA.

TWO-WAY WATER TURBINE.

Application filed May 8, 1925. Serial No. 28,860.

This invention relates to improvements in water turbines in which water wheels are arranged to be successively acted upon and rotated in relatively opposite directions by a current of water passing under pressure through the turbine casing; and the objects of the invention are:

First, to provide a turbine particularly adapted for use in places where tide-water is drained off and where the flow of water is reversing; second, to provide a turbine of such construction and operation that it can be used in either vertical, horizontal, or inclined position; and, third, to develop more power by connecting and increasing the number of water wheels in a novel and practicable manner.

With the above and other objects in view, the invention comprises a two-way motion turbine consisting of three, five, seven or more wheels mounted in such manner that they form two separate units or sections, the two sections being so combined to form one unit with two-way motion converted into a one-way motion. An important feature of the invention is the connecting of certain of the water wheels to each other by means of a casing and thus forming one section.

One form of the invention is illustrated in the accompanying drawings, in which.

The casing 1 of the turbine is tubular and, in the form herein disclosed, disposed vertically so that the water enters at the upper end and discharges at the lower end, the bottom of the casing being elevated by the supporting legs 2. The wheels of the turbine are arranged in two separate units or sections, one section including the wheels 3 and the other section including the wheels 4 and wheels 4'.

Figure 1:
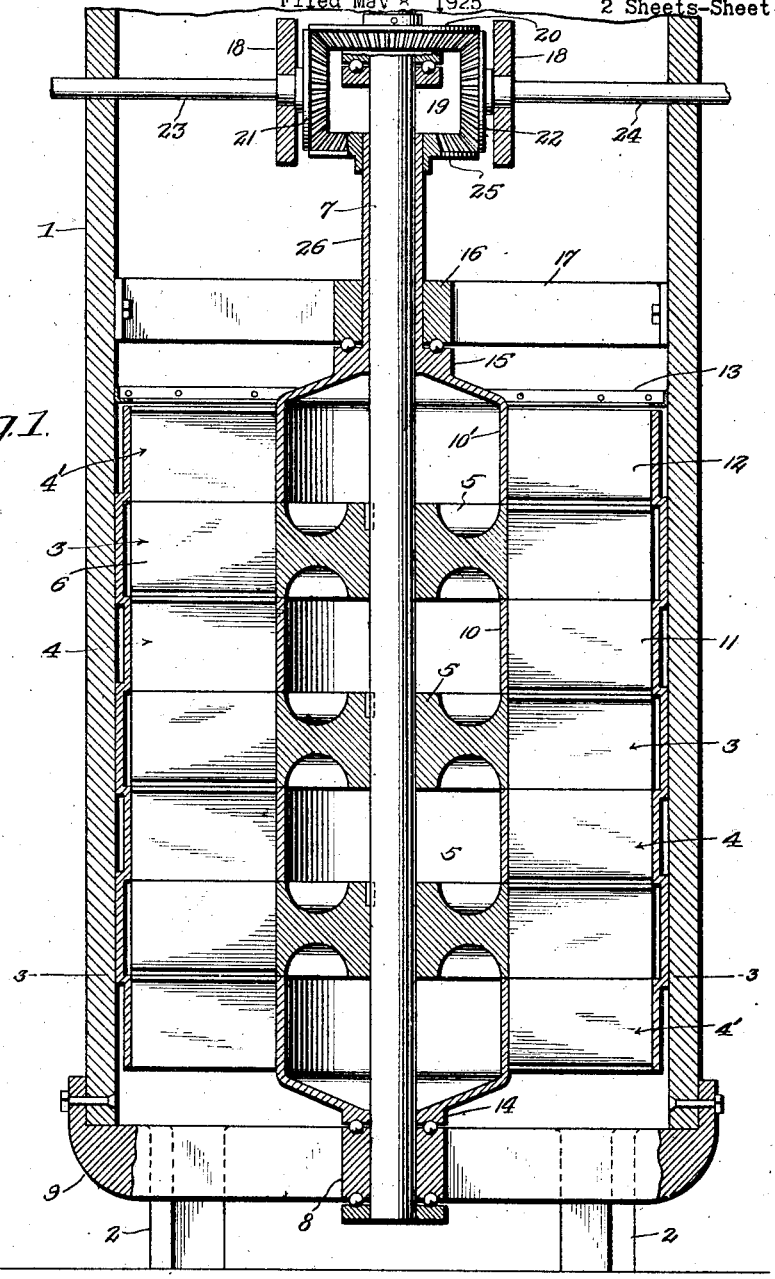
Figure 1 is a vertical section of the assembled turbine.
Figure 2:
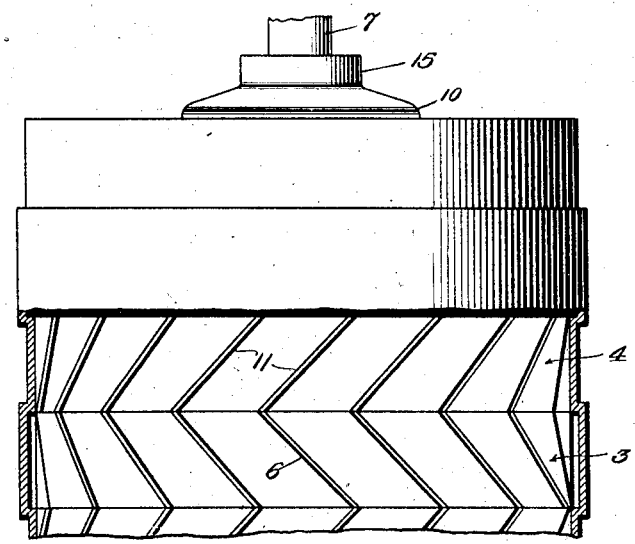
Figure 2 is a fragmentary detailed view, partly in elevation and partly in section, of the assembled turbine wheels.
Figure 4:
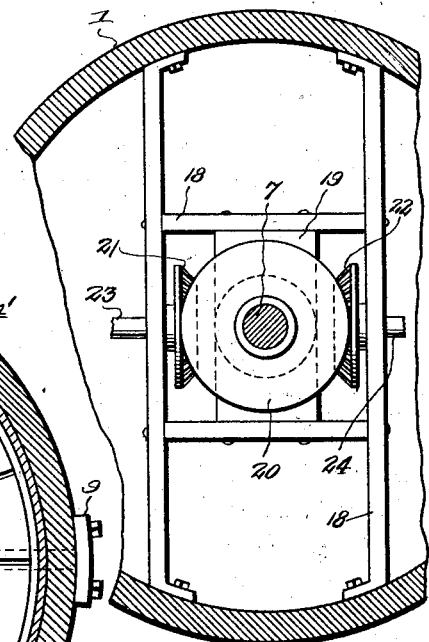
Figure 3:
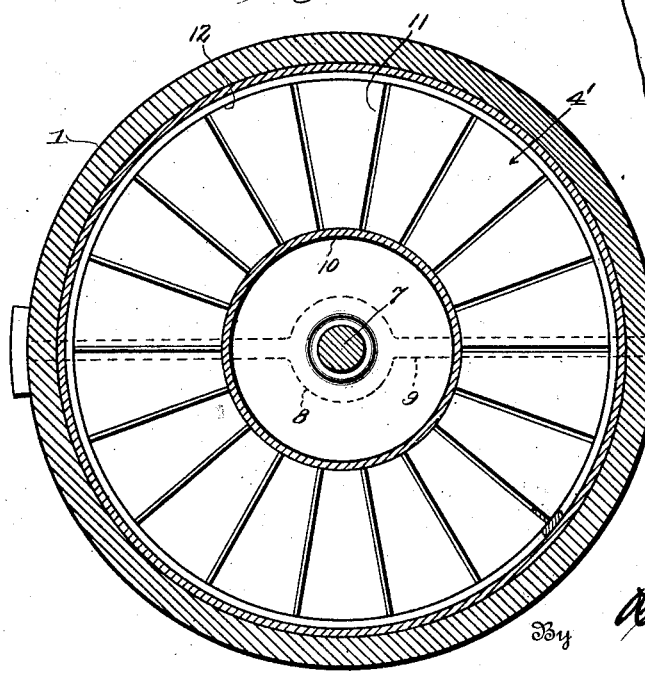
Figure 3 is a horizontal sectional view on line 3—3 of Figure 1, and Figure 4, is a fragmentary view of the upper end of the turbine, disclosing the arrangement of gearing.

The wheels 3 are respectively formed with a solid hub 5 and vanes 6 radiating from the hub and are fixed at suitable distances apart upon wheel shaft 7 extending centrally through casing 1. Wheel shaft 7 has its lower end journalled in a bearing 8 of a bearing-bracket 9 arranged cross-wise of the bottom of the casing and secured thereto as shown. The wheels 4 are respectively formed of a substantially wide, annular, band or collar 10 and vanes 11 radiating therefrom and inclined oppositely to the vanes 6 of wheels 3 so that the wheels 4 will be rotated in a direction opposite to the direction of rotation of wheels 3. Loosely mounted on the shaft 7, near the upper and lower ends thereof and having their open sides facing inwardly toward each other, are oppositely disposed cup-shaped members 10' each of which is provided at its closed end with an opening through which the ends of the shaft project. These cup-shaped members are constructed of sufficient depth and inside diameter to provide a chambered space around the shaft of substantial proportions and have vanes 11 radiating circumferentially therefrom, whereby the top and bottom wheels 4' are provided. The annular bands 10 of the intermediate wheels 4 are substantially of the same diameter as the cup-shaped members so as to properly align with the latter, as shown in Fig. 1. In assembling the parts, the wheels 3 are so positioned and arranged upon the shaft 7 that there is a solid hub between each cup-shaped member and the adjacent band 10, and also between the bands, whereby a plurality of spaced apart, hollow, chambers are provided along the shaft. Hence, an enclosed, substantially hollow, column at the center of the turbine is obtained which means less weight on the shaft and a consequent reduction in the strain thereon during the operation of the device. Wheels 4 and 4' are connected together to form a single unit or section by having their vanes 11 fastened at their outer extremities to the inside of a cylinder 12, which cylinder extends completely around the wheels of both sections, as clearly shown in Figs. 1 and 2. The cylinder 12 may be composed of superposed metallic bands welded or otherwise united at the joints to provide a unitary cylindrical structure, the bands which surround the vanes 6 or wheels 3 being slightly larger in diameter than the other bands so as to freely accommodate the said vanes. Secured to the casing, above the cylinder 12, is an annular guard 13 which overlaps the upper end of the cylinder and prevents water from passing between the cylinder and the casing. In turbines employing a number of wheels corresponding to wheels 4 and 4' of the present invention, a separate shaft is required for each wheel and each wheel operates independently of the other wheels. However, by having the wheels 4 and 4' connected together in the manner herein described, it is possible to use any number of wheels 4 without the necessity of equipping each with a separate shaft and the driving force of all the wheels 4 is applied to a single driven element in a praticable and economically efficient manner.

The cup-shaped end members 4' are provided with thrust collars 14, the thrust collar of the bottom wheel being opposed to the bearing 8 of bracket 9 and the thrust collar 15 of top wheel 4' being opposed to the bearing 16 of a bearing-bracket 17 extending cross-wise above the wheels. Suitable antifriction bearings may be provided between the opposing faces of the said bearings and thrust collars. Within casing 1 and above bracket 17 is secured a frame work 18, including a bearing block 19 through which extends wheel shaft 7. Fixed to the wheel shaft above block 19 is a beveled gear 20 and meshing with this gear on opposite sides thereof are beveled gears 21 and 22 mounted upon the inner ends of horizontal power shafts 23 and 24, which shafts are supported by the frame work 18 and extend outwardly through the side walls of casing 1. Arranged below beveled gear 20 and in mesh with the lower portion of beveled gears 21 and 22 is a beveled gear 25. Beveled gear 25 is fixed upon the upper end of a sleeve 26 which encircles wheel shaft 7 but which is made integral with the thrust bearing 15 of top wheel 4. Sleeve 26 is suitably supported in the central bearing 16 of the bearing-bracket 17.

In the operation of the device, the head of water impinging the vanes of the top wheel 4' turns the latter in one direction, with a corresponding movement on the part of the lower wheels connected therewith by means of the casing, as previously described; the wheels and casing revolving as a single unit. As the water passes from the top wheel 4' it acts upon wheel 3, both sets of wheels being thus successively acted upon and rotated as the water flows through casing 1, thereby imparting motion to wheel shaft 7 and sleeve 26, which motion is subsequently converted into continuous rotary motion by means of the beveled gearing connecting the wheel shaft and sleeve with power shafts 23 and 24.

Having thus described the invention, what is claimed as new is:

In a water turbine, a shaft, a pair of oppositely disposed cup-shaped members loosely mounted upon said shaft with their open sides facing inwardly toward each other, each of said members being provided at its closed end with an opening through which the said shaft projects and being of such depth and inside diameter as to provide a chambered space around the shaft of substantial proportions, a plurality of substantially wide annular bands interposed between the said cup-shaped members and approximating the same in diameter, a plurality of solid hubs fixed on the said shaft, said hubs being interposed between the said cup-shaped members and the bands adjacent thereto and also between the intermediate bands whereby a plurality of spaced apart hollow chambers are formed around the said shaft, vanes radiating from the said hubs, vanes radiating from the said cup-shaped members and from the said annular bands respectively, means connecting the vanes of the cup-shaped members with the vanes of the said bands, a gear carried by the said shaft, and a gear mounted on one of the said cup-shaped members.

In testimony whereof I affix my signature.

WILLIAM FINNE.